United States Patent [19]

Southworth

[11] Patent Number: 4,896,253
[45] Date of Patent: Jan. 23, 1990

[54] FLASHLIGHT SKEWER

[76] Inventor: Grant L. Southworth, 618 E. 640 North, Orem, Utah 84057

[21] Appl. No.: 303,875

[22] Filed: Jan. 30, 1989

Related U.S. Application Data

[63] Continuation-in-part of Ser. No. 190,869, May 6, 1988, abandoned.

[51] Int. Cl.⁴ .............................................. F21V 33/00
[52] U.S. Cl. ..................... 362/109; 362/120; 362/208; 362/253; 99/421 H
[58] Field of Search ............... 99/339, 421 R, 421 H, 99/421 HH, 421 HV, 421 A; 362/109, 119, 120, 208, 253, 92, 197; 17/15

[56] References Cited

U.S. PATENT DOCUMENTS

| | | | |
|---|---|---|---|
| 2,544,059 | 3/1951 | Wickwire | 362/197 |
| 2,783,705 | 3/1957 | Vrionis | 99/421 HV |
| 3,059,568 | 10/1962 | Fortis | 99/421 H |
| 3,359,888 | 12/1967 | Deege et al. | 99/421 HV |
| 3,387,555 | 6/1968 | Moran | 99/421 HV |
| 4,228,485 | 10/1980 | Hubbard et al. | 362/197 |
| 4,495,550 | 1/1985 | Visciano | 362/197 |
| 4,697,228 | 9/1987 | Mui et al. | 362/208 |
| 4,815,367 | 3/1989 | Hanson et al. | 99/421 H |

FOREIGN PATENT DOCUMENTS 967765  8/1964  United Kingdom ................ 362/119

Primary Examiner—Ira S. Lazarus
Assistant Examiner—Sue Hagarman
Attorney, Agent, or Firm—Lynn G. Foster

[57] ABSTRACT

A mechanically motorized portable skewer/flashlight assembly comprising a housing, flashlight structure carried by the housing which serves as a handle for the skewer, the assembly also comprising a motor driven telescopic rod and a food-receiving tip. The motor may also comprise an audio source of advertising and/or music.

16 Claims, 3 Drawing Sheets

FLASHLIGHT SKEWER

CONTINUITY

This application is a continuation-in-part of my co-pending U.S. patent application Ser. No. 190,869, filed May 6, 1988 now abandoned.

FIELD OF INVENTION

The present invention relates generally to outdoor recreation, and more specifically to a rotating skewer in combination with a standard flashlight. The components accommodate use both as a skewer and as a flashlight source of light.

PRIOR ART

One of the pleasures of camping out is roasting foods such as marshmallows, wieners or shish-ka-bobs on an open campfire. The usual method of doing this is to cut a branch from a tree or use a coat hanger as a skewer. This approach can often be frustrating, dangerous and-/or ineffective.

A satisfactory tree branch is often hard to find, especially at well-used campground sites. Often one must travel a great distance to locate a suitable branch. This is not only tiring, but decreases the pleasure of the outing and increases the likelihood of an encounter with a dangerous animal, such as a rattlesnake, or an encounter with a dangerous plant, such as poison ivy.

Also to be considered is the cumulative ecological impact of procuring such branches. Not only does cutting the branch itself cumulatively harm the environment, but decreases the beauty of the natural setting. If all campers practiced this method of securing a skewer, the beauty of our campgrounds and recreational areas would soon disappear.

Once a tree branch is obtained it has to be prepared by sharpening the distal tip and by removing the bark to the extent desired. This is most often done by the use of a pocket knife, which can be a hazardous undertaking. Not only is it hazardous, but unless one is skilled in the use of a knife, a misplaced cut can ruin the stick for the intended purpose. Even assuming that the branch is safely and properly prepared, there are still problems with the use of a tree branch. As the desired food cooks over the fire, undesired tree sap is sometimes infused into the food. Once the problem of sap is eliminated, the stick often burns into two parts, causing the food to fall into the fire. Furthermore, most such tree branches are very pliant and yieldable, making uniform cooking of the food difficult, if not impossible.

Another standard alternative is to utilize a coat hanger as a skewer. To do this a pair of standard pliers, or, preferably, a pair of wire cutters are advisable. The first steps in preparation of such a skewer are to (1) either unwind the hanger at the wound connection site at the neck thereof or to cut the hanger and (2) straighten the hanger at the rounded corners thereof. Once this is accomplished, the paint has to be burned off of the roasting end to prevent taste distortion, although this is not always entirely satisfactory. Even when the hanger is finally prepared for use, the highly flexible nature of the hanger material often results in burning of the food because of structural instability or non-uniform cooking of the food. In addition to this, it is almost impossible to rotate some types of food with this type of skewer since instead of rotating with the skewer, the food remains stationary while the skewer turns. Often the food falls off of the skewer.

All things considered, use of the two types of skewers discussed above can be a very frustrating and unsatisfactory experience. Even if the cooking proves satisfactory, the inconvenience and time factor involved in locating and preparing such a skewer overrides any benefit gained.

This leaves the final alternative, i.e. utilization of a commercial skewer. Prior commercial skewers are typically expensive, cumbersome, of fixed dimensions and difficult to transport and use because they are relatively bulky and heavy, thus precluding their use in a backpaking setting where both space and weight considerations are priorities. In addition, even when the intended use is in a conventional campground setting, transportation of a commercial skewer can create problems due to their bulky nature coupled with the danger created by transporting a pointed skewer tip. Inadvertent damage and injury can result to other items packed in close proximity to the skewer and to persons in the vicinity, respectively.

BRIEF SUMMARY AND OBJECTS OF THE INVENTION

In brief summary, the present invention overcomes or substantially eliminates the problems associated with the prior art. It is directed to an outdoor cooking instrument comprising a skewer comprising a food receiving rod in combination with a handle which also comprises a flashlight. This allows separate or simultaneous use of the flashlight for illumination in the standard manner and use of the skewer as an aid in outdoor cooking. The skewer rod is connected to a motor which rotates the rod and the food on the distal end of the rod while the user grips the stationary handle. The present invention may be constructed in such a manner that it is lightweight, compact and readily transportable. A windable spring-powered motor with a power output shaft is preferred and may incorporate therein a source of audio output, such as music. An alternate source of power could be a small battery powered motor. A telescopic skewer rod having a detachable skewer tip is currently preferred.

With the foregoing in mind, it is a principal object of the present invention to provide a novel skewer instrument and flashlight.

Another important object is the provision of a novel skewer/flashlight combination.

It is a further significant object to provide a novel skewer/flashlight assembly comprising a power skewer drive.

It is another dominant object of the invention to provide an improved skewer/flashlight assembly which is lightweight and compact for facile transportation to any desired cooking site and for easy storage.

It is another primary object of the present invention to provide a mechanically rotated portable skewer assembly.

Another paramount object is provision of a novel skewer/flashlight instrument which incorporates a source of audio output therein to provide entertainment and/or advertising during the cooking process.

It is a further significant object to provide a novel combination comprising a skewer rod used in combination with a flashlight whereby the flashlight may also be used either separately or simultaneously for illumination.

It is a further object to provide a skewer with an improved capacity for uniform cooking in remote locations as well as in easily accessible ones.

These and other objects and features of the present invention will be apparent from the detailed description taken with reference to the accompanying drawings.

DETAILED DESCRIPTION OF THE ILLUSTRATED EMBODIMENT

Figures 1, 2, 3:
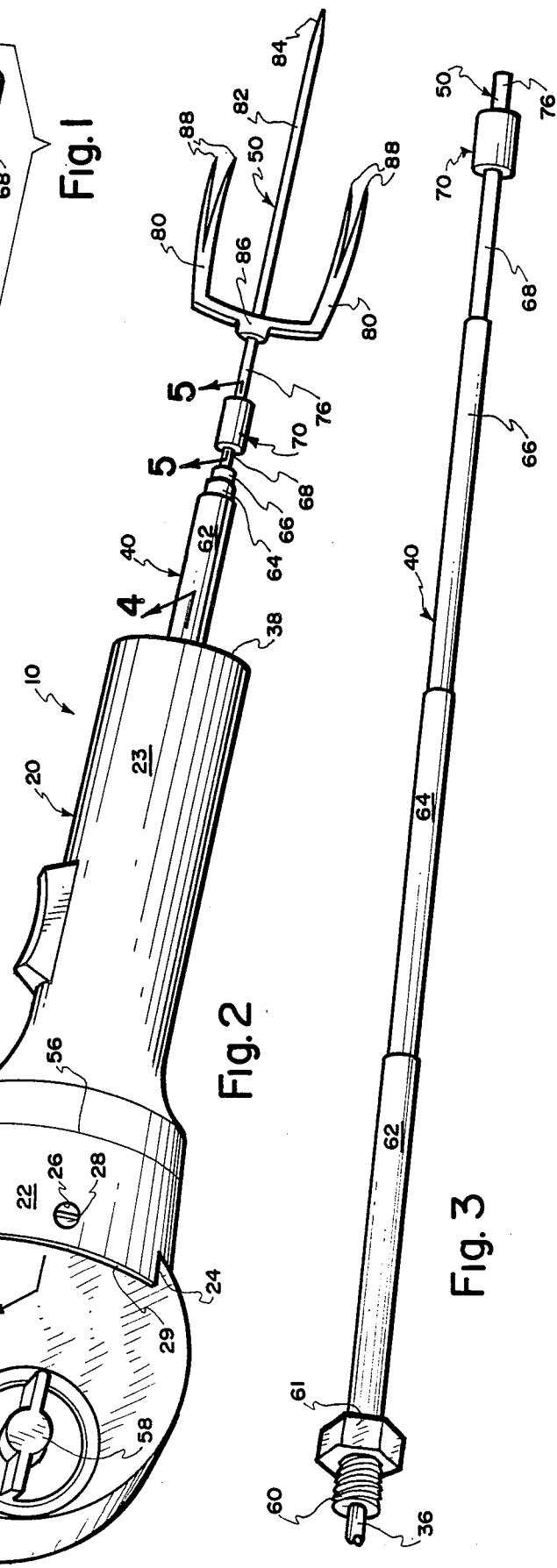
FIG. 1 is an exploded perspective view of the component parts of a presently preferred skewer/flashlight instrument, in accordance with the present invention.
FIG. 2 is a perspective view of the skewer/flashlight instrument of FIG. 1 shown in its assembled configuration.
FIG. 3 is a fragmentary perspective view of the telescopic skewer rod of the instrument of FIG. 1 shown in its fully extended position and including the skewer-rod/skewer-tip coupling.

Reference is now made to the drawings wherein like numerals are used to describe like parts throughout. Specific reference is made to FIGS. 1 and 2, which illustrate a presently preferred embodiment of a skewer/flashlight assembly, generally designated 10, constructed in accordance with the principles of the present invention. As shown in FIG. 2, skewer assembly 10 is in an assembly but telescopically collapsed condition.

The assembly shown in FIG. 1 is comprised of essentially four major parts. These are: a substantially standard plastic flashlight housing or casing 20; a commercially available combination windable mechanical (or battery powered) motor and music box mechanism 30; a telescopic skewer rod 40; and a multiple-pronged skewer tip 50. When these component parts are assembled in an appropriate manner, as described below, the resultant assembly comprises a mechanical skewer which extends or contracts telescopically, and also rotates to allow for easy and efficient cooking capabilities. In the unassembled condition, the aforesaid component parts are easily stored and transported, with the slightly modified flashlight housing 20 being capable of comprising a flashlight for providing illumination. Thus, for hiking, camping and like purposes the preferred skewer assembly and components thereof accommodate multiple utility, thereby reducing the number of items to be taken.

The flashlight housing 20 of the skewer device is substantially a standard plastic flashlight rigid casing with the interior components of the flashlight temporarily removed. The housing 20 comprises three slight modifications. The wall thickness of the hollow flashlight housing is illustrated as being substantially uniform throughout. Preferably, the flashlight used is of a type that has a head portion 21 that can be unscrewed from the illustrated main section 23 of the housing 20 of the flashlight, the head portion 21 comprising an apertured threaded cap, a removable lens and a bulb. The flashlight used in the illustrated skewer assembly 10 may comprise either C-cell or D-cell batteries. Smaller capacity batteries can be used on smaller skewer assemblies made according to the present invention.

As illustrated, the flashlight housing 20 basically comprises a main cylindrical body portion 23 and a head portion 21. The head portion 21 accomodates receipt of a standard lens and bulb assembly when used for illumination purposes. The lens and bulb assembly are readily removed when the head portion 21 is unscrewed from the body portion 23. This procedure is preliminary to attachment of the motor assembly 30 to the head of the flashlight, as explained hereinafter in greater detail. The head portion 21 comprises a distal lip 22, which is modified to include opposed top and bottom notches 24 sized to contiguously receive the exterior casing of the motor assembly 30, as shown in FIG. 2. The lip 22 also comprises two opposed screw-receiving side apertures 26, which are illustrated as being offset 90° from the notches 24.

Slots or ntoches 241 extend into the lip 21 to a depth sufficient to adequately nonrotatably support the motor assembly 30, this depth being illustrated as being approximately one-fourth of the overall length of the motor assembly 30. The width of each slot 24 is substantially the same as the thickness of the exterior of the motor assembly 30 in order to allow easy but snug insertion of said motor assembly 30 into the slots 24.

Each aperture 26 receives an appropriately sized set screw 28 for the purpose of holding the driving motor assembly 30 in place within the flashlight head portion. The apertures 26 are illustrated as being located halfway between the outer edge 29 of the lip 22 and the back or base edge of the slots 24. When each set screw 28 is placed through the associated aperture 26, the leading tip of each screw 28 seats in a threaded or undersized blind bore 32 in the exterior disc-shaped casing 34 of the motor assembly 30. When screws 28 are tightly set they collectively securely and nonrotatably hold the motor assembly to the housing 20 against relative displacement. Thus, the motor assembly 30 is held in a stable predetermined position such that the motor drive shaft 36, the exterior of which is threaded to receive the proximal fitting of the skewer rod, is aligned with the center line of the hollow flashlight housing 20.

Figure 4:
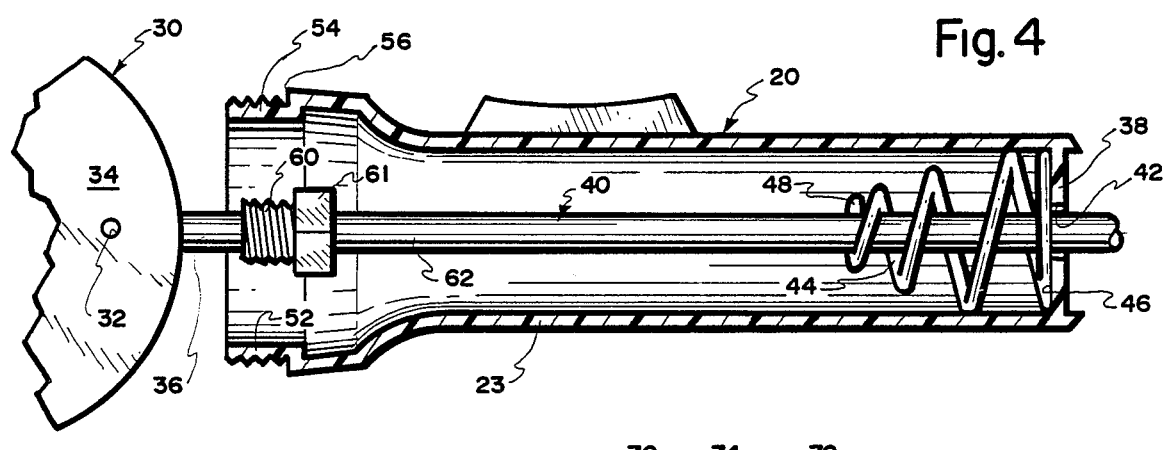
FIG. 4 is a fragmentary cross-sectional view taken along lines 4—4 of FIG. 2 with the threaded cap.

The main body portion 23 of the housing 20 comprises a radially disposed proximal end wall 38 which is an integral part of the body portion 23. See FIG. 4. End portion 38 is generally disc-shaped. The end enclosure 38 is modified from a standard end section of the type of flashlight housing illustrated by drilling or otherwise forming a hole 42 in the exact center thereof so as to be aligned with the center line of the housing 20. Aperture 42 is sized to accommodate loose passage therethrough of the telescopic skewer rod 40, while providing adequate support thereto without inhibiting the rotation thereof. Thus, as illustrated in FIG. 4, the aperture 42 thus has a diameter slightly greater than the outside diameter of the skewer rod 40. At the same time, the wall 38 with aperture 42 therein accommodates retention of the batteries in the body 20 when used as a flashlight. Also located in the interior of the battery receiving section 25 is a typical, tapered flashlight compression spring 44 of a generally conical shape. This spring is conventionally permanently attached to the interior surface 46 of the proximal wall 38 at the larger base of the coil. The spring 80 gradually tapers from rear to front to a smaller diameter inwardly from the base of the coil to the distal end 48 of the coil 44. The distal end 48 of the coil 44 has a diameter slightly greater than the adjacent outside diameter of the telescopic skewer rod 40, accommodating loose passage of the rod 40 through the coil center. Since this interior coil 83 is centrally located within the flashlight body cavity, it also serves to give added support to the skewer rod when the skewer combination 10 is fully assembled.

The distal end 52 of housing body section 23 is comprised of exterior threads 54 which correspond to and mesh with like interior threads at the proximal end of the distal head section 21 in a conventional fashion and by which attachment of the two sections to each other is accomplished, leaving a visible annular interface 56.

The motor driving mechanism 30 comprises casing 34 which has an overall cylindrical disc shape similar to a hockey puck. Thus, the side-to-side dimension of the casing 34 is substantially less than the diameter thereof. It is presently preferred that the motor comprise a conventional mechanically wound music box motor mechanism, which is spring powered. The spring is tightened or wound by rotation of a handle 22. This type of device is commercially available and commonly used to play music and drive a mobile mounted to the frame of a baby's crib.

The motor casing 34 comprises a circular aperture through which the drive shaft 36 extends (FIG. 4). The shaft 36 is conventionally journalled to insure true axial rotation thereof. The exposed end of the drive shaft 36 comprises a diametrally-enlarged externally-threaded fitting 60, sized to screw onto the motor shaft 36 and into the corresponding threaded female coupling 61 which is nonrotatably attached to the proximal telescopic skewer rod 40. Once the internal spring of the motor assembly 30 is wound and activated, the motor drive shaft 36 turns slowly, which in turn slowly rotates the skewer rod 40.

In addition, the drive motor is a source of audio output during rotation. While audio availability is strictly optional, music therefrom can be entertaining or prerecorded advertising can be commercially significant. The particular music to be played can be selected from a wide range of songs. Advertising jingles for promotional purposes may stimulate distribution based upon no price or low price. Alternatively, if a silent mode is desired, conventionally the unit can be made non-musical by use of a switch which sometimes takes the form of a screw. Since the motor is a wound spring-powered mechanism, no additional power source or extra batteries are needed.

The skewer rod 40 is generally telescopic in nature, similar to a radio antenna for an automobile. It may comprise any suitable durable, fireproof and rigid metal or plastic and is generally hollow to accommodate its telescopic characteristic. As illustrated in FIG. 3, each successive section 62, 64, 66 and 68 decreases in diametral size from the drive shaft coupling end 61 to the skewer tip coupling end at 70. The overall optimum rod length in the fully extended position is presently believed to be about twenty-four inches, but that could be varied without altering the overall intent of the invention. In the completely collapsed position, the rod is approximately six inches long and is, therefore, easily stored and transported.

The distal end of the rod 40, at section 68, is secured to distal coupling 70 as hereinafter explained.

Figure 5:
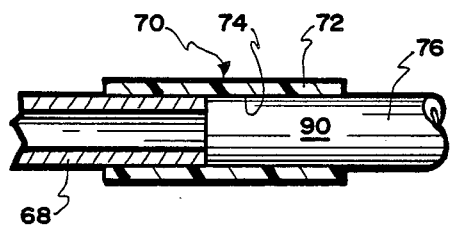
FIG. 5 is a fragmentary cross-sectional view of the skewer-rod/skewer-tip coupling in the coupled position taken along lines 5—5 of FIG. 2.

FIG. 5 illustrates the skewer-rod/skewer-tip coupling 70. An outer coupling sleeve 72 is comprised of a heat resistant plastic material, at least one inch in length. The inside diameter, at surface 74, of the sleeve 72 is less than the outside diameter of both the hollow skewer rod at section 68 and solid shaft 76 of the skewer tip, allowing forced insertion of the rod at 68 and end 76 into the hollow interior of the sleeve to create a structurally stable and reliable interference fit juncture, as illustrate in FIG. 5.

The coupling 70 nevertheless may be manually separated when use of the skewer assembly 10 is over and it is desired to store and/or transport the components thereof in a disassembled condition.

The skewer tip 50 is comprised of a plurality of side or offset prongs 80 oriented on opposite sides of a main prong 82. The main prong 82 is substantially longer than the side prongs 80. The main prong 82 terminates in a sharply pointed tip 84 which is suited for attaching food thereto. Each side prong 80 is attached to the main prong 82 at a common connector site 86 by welding or in any other suitable way. Each side prong 80 is essentially L-shaped ending in a bifurcated sharp tip 88 which is directed parallel to the prong 82.

The opposed 180° separation between the prongs 80 provides balance when the skewer 50 is rotated by the motor assembly 30 via rod 40. However, a different number of prongs can be used. Spacial consideration necessary for accommodating food items also need to be considered when determining the prong orientations. A single prong can comprise skewer 50. Depending upon the desired food to be cooked, alternative types of skewers or skewer tips can be used.

The skewer assembly 10 of the present invention is capable of being assembled or disassembled in a relatively short time by an essentially untrained person. The first step in assembling the unit 10 is to remove the lens and bulb portion of the flashlight 20. This is done by unscrewing the head 21 of the flashlight from the main body portion 23 at interface 56. The batteries are next removed and the telescoping skewer rod is passed centrally through the flashlight housing 20, with the smaller end 68 first introduced through the aperture 42 in the butt end 38 of the flashlight.

Next, the large end at threaded female fitting 61 of the skewer rod 40 is attached to the male threaded fitting 60 of the rod 40. Thus, selective rotation of the drive shaft 36 by the motor mechanism 30 will rotate the rod 40. The motor mechanism 30 is linearly advanced into slots 24 of the flashlight head 21 and secured thereto by two set screws 28, as heretofore explained. Preferably once the driving mechanism 30 is thus secured to the rod 40, the head portion 21 is threadedly resecured to the body 23, although it is not essential that flashlight parts 21 and 23 be separate when assembly commences.

To complete the assembly, one end of the coupling 70 is force-fit onto the smaller end 64 of the telescopic skewer rod 40 and the end portion 90 of the skewer tip 50 is force-fit into the other end of the coupling 48. Preferably, each end extends into the coupling approximately half way with the respective ends abutting or nearly abutting each other. The telescopic skewer rod can be telescopically extended to the desired length. The motor driving mechanism 30 is manually wound by use of the handle 58. Food is added to the skewer end 50 and cooking proceeds normally as the rod 40, skewer end 50 and food are slowly rotated.

Figure 6:
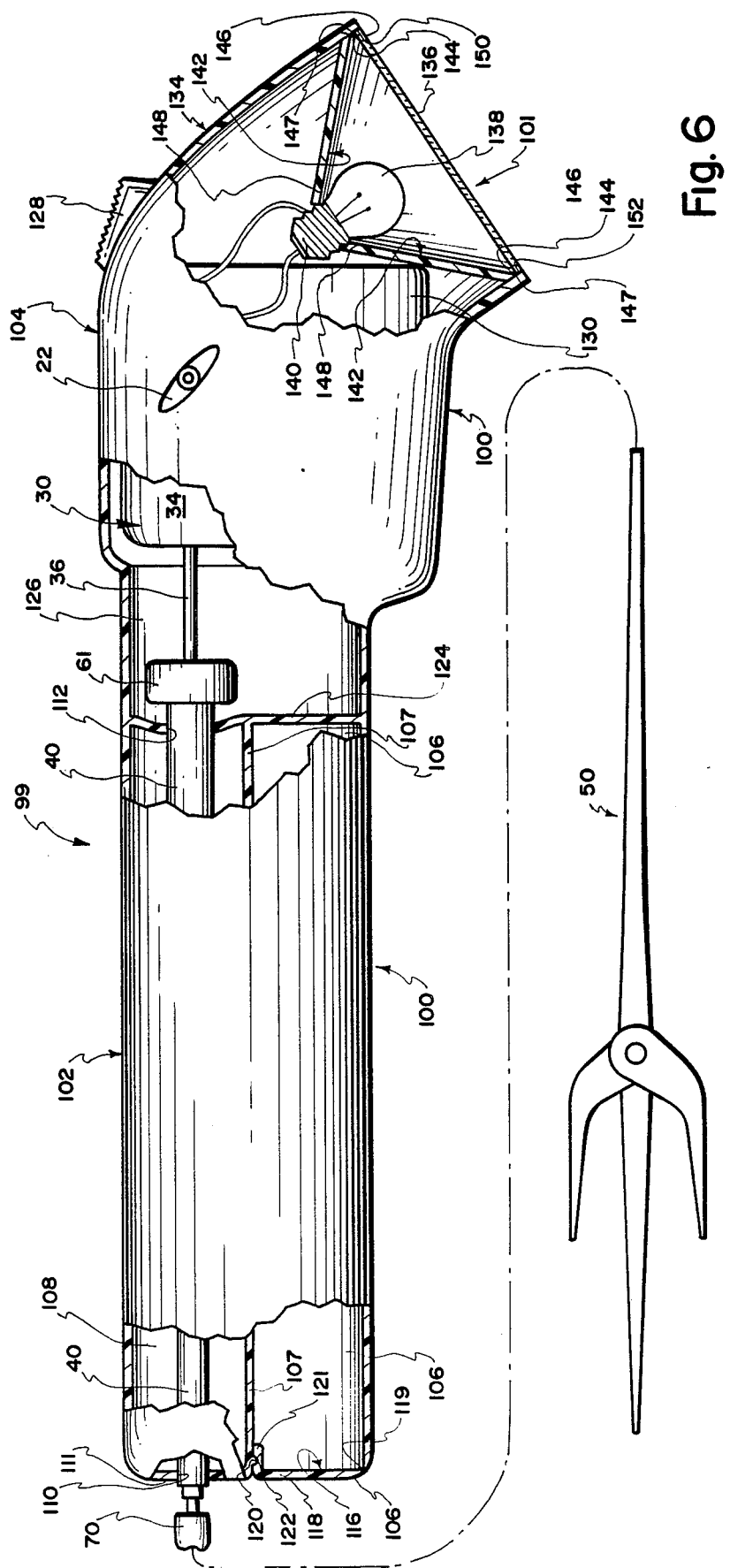
FIG. 6 is a side elevational view of a second presently preferred skewer instrument/flashlight, with parts broken away for clarity, which can serve as either or both at any point in time.

The second preferred skewer/flashlight assembly, generally designated 99, is shown in FIG. 6 and, as illustrated, comprises essentially five major parts. These are: a molded plastic pistol-shaped apparatus housing, generally designated 100; a standard flashlight lens and bulb assembly, generally designated 101; a windable mechanical or battery powered motor and music box mechanism, generally designated 30; a telescopic skewer rod 40 and a multiple prong removable skewer tip 50. Since many of these and other parts are identical to those hereinbefore described in conjunction with the first skewer/flashlight embodiment 10, identical numbers therefor are used in FIG. 6 and a repeat of the description for said parts is deemed unnecessary. Assembled as shown in FIG. 6, the component parts mentioned allow simultaneous or separate use of the heretofore described mechanical skewer and flashlight.

The housing 100 is illustrated as having a cross-sectional shape of a cylinder. The distal section 102 is shown as being linear in the axial direction, while the proximal section 104 is shown as being linear as well, being disposed at a 45 degree angle in respect to section 102. Preferably, housing 100 is manufactured, by injection molding, as two identical though opposite hand sections which are bonded, welded or otherwise secured together. The distal section 102 houses the telescopic skewer rod 40 and a storage area 106 in which the multiple prong skewer tip 50 is stored when not in use. Skewer rod 40 is permanently supported by the housing 102 within storage area 108, which makes up the upper half of distal housing section 102. A longitudinal rib 107 separates compartments 106 and 108, and runs nearly the entire length of distal section 102. As shown in FIG. 6, skewer rod 40 is supported at both ends of the housing section 102 at such that the rod 40 is suspended within the storage space 108. Specifically, the rod 40 is snugly fit into apertures 110 and 112 in transverse walls 111 and 124, respectively. The support locations 110 and 112 are properly sized to act as bushings, thus allowing the skewer rod 40 to freely rotate while preventing any material transverse movement of the rod 40. The rod 40 is externally extendible and comprises distal fitting 70 by which the rod 40 is releasibly connected to the proximal end of the skewer tip 50.

At the distal end 114 of storage compartment 106 is located an access site 116 into the compartment 106. Access 116 comprises a small door or hatch 118, which is preferably unitarily molded as an integral part of housing 100 and thus requires no separate attachment. A groove 120 is located in top lip 121 of the door 118. Groove 120 snugly receives a tongue 122 located near the distal end of rib 107, said tongue and groove arrangement providing for snap-fit closure and manual opening of the door 118. A plastic or living hinge 119 accommodates displacement of the door 118 between its open and closed positions.

The hollow interiors of the distal housing section 102 and proximal housing section 104 are separated by a rib 124. Aperture 112, as shown in FIG. 6, is located in the rib or wall 124, with rib 124 also forming the proximal end of storage compartments 106 and 108. The proximal end of rod 40 extends through wall 124 into a compartment 126 in the hollow interior of the proximal section 104 of housing 100. The proximal end of telescopic skewer rod 40 is nonrotatably attached to the motor shaft 36 via threaded female coupling 61, as described herein before. The drive shaft 36 is rotatably driven by the motor assembly 30, when actuated. The motor casing 34, illustrated in FIG. 6 is shaped somewhat differently than that shown in FIGS. 1 and 2, but is substantially the same in structure, principle and function and, hence, need not be described again.

Proximal section or handle 104 surrounds the motor assembly 30 and the lens and bulb illumination (flashlight) assembly 101. A flashlight activation switch, designated 128, is carried in an exposed condition at the exterior of the housing section 104. Two batteries (preferably standard "C-size"), designated 130 are disposed within the housing section 104 and selectively provide electrical energy to the illumination assembly 101.

Assembly 101 is situated within the housing or handle section 104 at the proximal end 134 and comprises well known flashlight components: a disk-shaped transparent protective lens 136, a light bulb 138, a socket 140, and an inset conical reflector 142. Conical section 142 is illustrated as being comprised of synthetic resinous material coated on the bulb side with a silver or otherwise reflective material which amplifies the amount of light emitted by light bulb 138. As shown, section 142 has a base portion 144, the annular edge 146 of which is illustrated as being force-fitted into the housing opening 147, although other forms of attachments such as threads could be used. The transparent lens 136 encloses the base portion 144 and serves to protect light bulb 138. Lens 136 is illustrated as being hinged to housing 104 at site 150, snap-fit at site 152 and free elsewhere. However, other ways of releasibly securing the lens in place can be used. At the apex portion 148 of conical reflector 142 electrically connected light socket 140 is immovably attached thereto, and light bulb 138 is screwed into light socket 140 in the standard manner for use.

The switch 128 is also standard to flashlight assemblies in general and is used to either complete or interrupt the electrical circuit facilitating the illumination or non-illumination of assembly 101, as desired by the user. As mentioned, two standard batteries 130 are used and serve to provide electrical power thereto. In the alternative, when and if a battery-powered motor assembly 30 is used to rotate skewer 40, batteries 130 can also serve as a source of electrical energy thereto.

The invention may be embodied in other specific forms without department from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalence of the claims are therefore to be embraced therein.

What is claimed and desired to be secured by United States Letters Patent is:

1. A hand-held combination skewer/flashlight assembly devoid of a surface-engaging support comprising:
  cantilevered elongated linear rod means having sufficient structural integrity so as to remain substantially linear when a wiener or the like is supported adjacent the distal end of the rod means;
  a food impaling tip at the distal end of the rod means;
  the skewer/flashlight assembly further comprising power means associated with the proximal end of the rod means so that when the power means are activated the rod means are rotated;
  the skewer/flashlight assembly also comprising housing means comprising (a) means which carry and solely support (1) the cantilevered rod means and (2) the power means and (b) manual handle means by which the entire assembly is hand-held;
  the housing means comprising flashlight means;

the housing means, the rod means and the power means of the skewer/flashlight assembly being free from surface-engaging support structure.

2. A hand-held combination skewer/flashlight assembly according to claim 1 wherein the flashlight means comprise electrical energy means, light source means and switch means whereby the rod means are selectively rotated by the power means and the light source means may be selectively illuminated, the rotation and illumination occuring either simultaneously or separately.

3. A hand-held combination skewer/flashlight assembly according to claim 1 wherein the power means comprise mechanically windable means.

4. A hand-held combination skewer/flashlight assembly according to claim 1 wherein the tip is removably coupled to the distal end of the rod means.

5. A hand-held combination skewer/flashlight assembly comprising:
elongated linear rod means having sufficient structural integrity so as to remain substantially linear when a wiener or the like is supported at one end of the rod means;
a food impaling tip at the distal end of the rod means;
power means associated with the proximal end of the rod means so that when the power means are activated the rod means are rotated;
housing means comprising means which carry and support the rod means and the power means and manual handle means;
the housing means comprising flashlight means;
the rod means comprising telescopic means by which the end-to-end length of the rod means is extended and constricted.

6. A hand-held skewer/flashlight assembly devoid of a surface-engaging support comprising:
housing means comprising manual grasping handle means by which the entire skewer/flashlight assembly is hand-held;
the housing means comprising flashlight means;
the skewer/flashlight assembly further comprising a mechanical motor mechanism comprising a rotatable drive shaft and an exterior casing;
means nonrotatably connecting the motor casing and the housing means;
exposed elongated telescopic rod means unsupported beyond the housing means and comprising a proximal end and a cantilevered distal end;
means connecting the proximal end of the rod means to the motor drive shaft so that rotation of the drive shaft rotates the rod means;
a food-engaging tip nonrotatably connected to the cantilevered distal end of the rod means.

7. A hand-held skewer assembly according to claim 6 wherein the motor mechanism comprises windable spring power means.

8. A hand-held skewer assembly according to claim 6 wherein the proximal end of the rod means are journalled for rotation in the housing means.

9. A hand-held skewer assembly comprising:
housing means comprising flashlight means;
a motor mechanism comprising a rotatable drive shaft and an exterior casing;
means stationarily connecting the motor casing and the housing means;
elongated rod means;
means connecting the rod means to the motor drive shaft so that rotation of the drive shaft rotates the rod means;
a food-engaging tip nonrotatably connected to the distal end of the rod means;
the rod means comprising telescopically extensible and collapsible means.

10. A hand-held skewer assembly comprising:
housing means comprising flashlight means;
a motor mechanism comprising a rotatable drive shaft and an exterior casing;
means stationarily connecting the motor casing and the housing means;
elongated rod means;
means connecting the rod means to the motor drive shaft so that rotation of the drive shaft rotates the rod means;
a food-engaging tip nonrotatably connected to the distal end of the rod means;
the motor mechanism comprising a source of audio output.

11. A hand-held skewer assembly comprising:
housing means comprising flashlight means;
a motor mechanism comprising a rotatable drive shaft and an exterior casing;
means stationarily connecting the motor casing and the housing means;
elongated rod means;
means connecting the rod means to the motor drive shaft so that rotation of the drive shaft rotates the rod means;
a food-engaging tip nonrotatably connected to the distal end of the rod means;
the tip being removably connected to the distal end of the rod means and the housing means comprising compartment means in which the removed tip may be stored.

12. A hand-held skewer assembly according to claim 11 wherein the compartment means comprises hinged closure means.

13. A hand-held skewer assembly according to claim 12 wherein the housing means comprise manual handle means disposed generally between the flashlight means and the rod means.

14. A hand-held skewer assembly according to claim 12 wherein the one end of the housing means is angularly disposed in respect to the other end of the housing means.

15. A hand-held skewer assembly comprising:
housing means comprising flashlight means;
a motor mechanism comprising a rotatable drive shaft and an exterior casing;
means stationarily connecting the motor casing and the housing means;
elongated rod means;
means connecting the rod means to the motor drive shaft so that rotation of the drive shaft rotates the rod means;
a food-engaging tip nonrotatably connected to the distal end of the rod means;
the rod means being exposed beyond one end of the housing means and the flashlight means being disposed at the other end of the housing means.

16. A hand-held skewer assembly comprising:
housing means comprising flashlight means;
a motor mechanism comprising a rotatable drive shaft and an exterior casing;

means stationarily connecting the motor casing and the housing means;

elongated rod means;

means connecting the rod means to the motor drive shaft so that rotation of the drive shaft rotates the rod means;

a food-engaging tip nonrotatably connected to the distal end of the rod means;

the rod means being telescopically extensible from a collapsible state within the housing means.

* * * * *